US009659479B2

(12) United States Patent
DeLuca

(10) Patent No.: US 9,659,479 B2
(45) Date of Patent: May 23, 2017

(54) SYSTEM AND METHOD TO INDICATE LACK OF USAGE FOR PERSONAL ITEMS

(71) Applicant: International Business Machines Corporation, Armonk, NY (US)

(72) Inventor: Lisa Seacat DeLuca, Baltimore, MD (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/836,162

(22) Filed: Aug. 26, 2015

(65) Prior Publication Data

US 2017/0061770 A1    Mar. 2, 2017

(51) Int. Cl.
| | |
|---|---|
| G08B 21/00 | (2006.01) |
| G08B 21/18 | (2006.01) |
| H04L 29/08 | (2006.01) |
| G08B 5/22 | (2006.01) |
| G06F 1/32 | (2006.01) |
| G06F 9/48 | (2006.01) |

(52) U.S. Cl.
CPC ......... *G08B 21/182* (2013.01); *G06F 1/3215* (2013.01); *G06F 9/485* (2013.01); *G08B 5/22* (2013.01); *H04L 67/12* (2013.01); *H04L 67/22* (2013.01)

(58) Field of Classification Search
CPC ..... G06F 1/3215; G06F 9/485; G08B 21/182; G08B 5/22; H04L 67/12; H04L 67/22
USPC ................................. 340/669; 713/323, 324
See application file for complete search history.

(56) References Cited

U.S. PATENT DOCUMENTS

| | | | |
|---|---|---|---|
| 4,229,813 A | 10/1980 | Lilly et al. | |
| 5,564,361 A | 10/1996 | Satterwhile | |
| 6,774,811 B2 | 8/2004 | Kaufman et al. | |
| 7,222,252 B2* | 5/2007 | Dutton | G06F 1/3215 713/323 |
| 7,685,450 B2* | 3/2010 | Dutton | G06F 1/3215 713/323 |
| 8,622,873 B2 | 1/2014 | McGown | |
| 2013/0024301 A1 | 1/2013 | Mikan et al. | |
| 2013/0297668 A1* | 11/2013 | McGrath | G06F 9/485 709/201 |
| 2015/0379460 A1* | 12/2015 | Zamer | G06Q 10/087 705/28 |

FOREIGN PATENT DOCUMENTS

WO    0182004 A1    11/2001

OTHER PUBLICATIONS

3M, Timestrip, printed Aug. 5, 2015 http://timestrip.com/visual_filter_indicator.php.

(Continued)

*Primary Examiner* — John A Tweel, Jr.
(74) *Attorney, Agent, or Firm* — Terrile, Cannatti, Chambers & Holland, LLP; Stephen A. Terrile

(57) ABSTRACT

A method, system and computer-usable medium for performing a usage monitoring operation on an item, comprising: defining a predefined criteria relating to usage of the item; monitoring usage of the item based upon input provided by a sensor associated with the item; and, generating an indication when the predefined criteria is detected.

17 Claims, 3 Drawing Sheets

(56) References Cited

OTHER PUBLICATIONS

GBI Data & Sorting Systems, Garments on Hanger (GOH), Hanging Garment Sorter/Sorting Systems, printed Aug. 26, 2015 http://www.gbisorting.com/hanging-garment-sorter.cfm.
R. High, "The Era of Cognitive Systems: An Inside Look at IBM Watson and How it Works," IBM Redbooks, 2012.
Yuan et al., "Watson and Healthcare," IBM developerWorks, 2011.
IBM, Journal of Research and Development, This is Watson, Introduction and Table of Contents, vol. 56, No. 3/4, May/Jul. 2012, http://ieeexplore.ieee.org/xpl/tocresult.jsp?reload=true&isnumber=6177717.

* cited by examiner

SYSTEM AND METHOD TO INDICATE LACK OF USAGE FOR PERSONAL ITEMS

BACKGROUND OF THE INVENTION

Field of the Invention

The present invention relates in general to the field of computers and similar technologies, and in particular to software utilized in this field. Still more particularly, it relates to a method, system and computer-usable medium to visually indicate to a user that a personal item has not been used in a threshold amount of time.

Description of the Related Art

The Internet of Things (IoT) has been recognized as the next significant revolution of Internet. The so-called IoT refers to providing various real-world things, such as streets, roads, buildings, water-supplying systems and household appliances with something like sensing devices, connecting them through the Internet and thereby executing specific programs, so as to achieve remote control or direct communication with these real-world things. The IoT has widened the scope of connected objects from electronics to all kinds of real-world things, that is, archiving human-machine communication and interaction, as well as the communication and interaction between objects by means of radio frequency identifications (RFIDs), sensors, binary codes and the like provided for various kinds of things through connecting to wireless networks via interfaces. As a result, many real world things can be monitored and operated through networking and their behaviors can be programmed and analyzed for human convenience.

SUMMARY OF THE INVENTION

A method, system and computer-usable medium are disclosed for A method, system and computer-usable medium for performing a usage monitoring operation on an item, comprising: defining a predefined criteria relating to usage of the item; monitoring usage of the item based upon input provided by a sensor associated with the item; and, generating an indication when the predefined criteria is detected.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
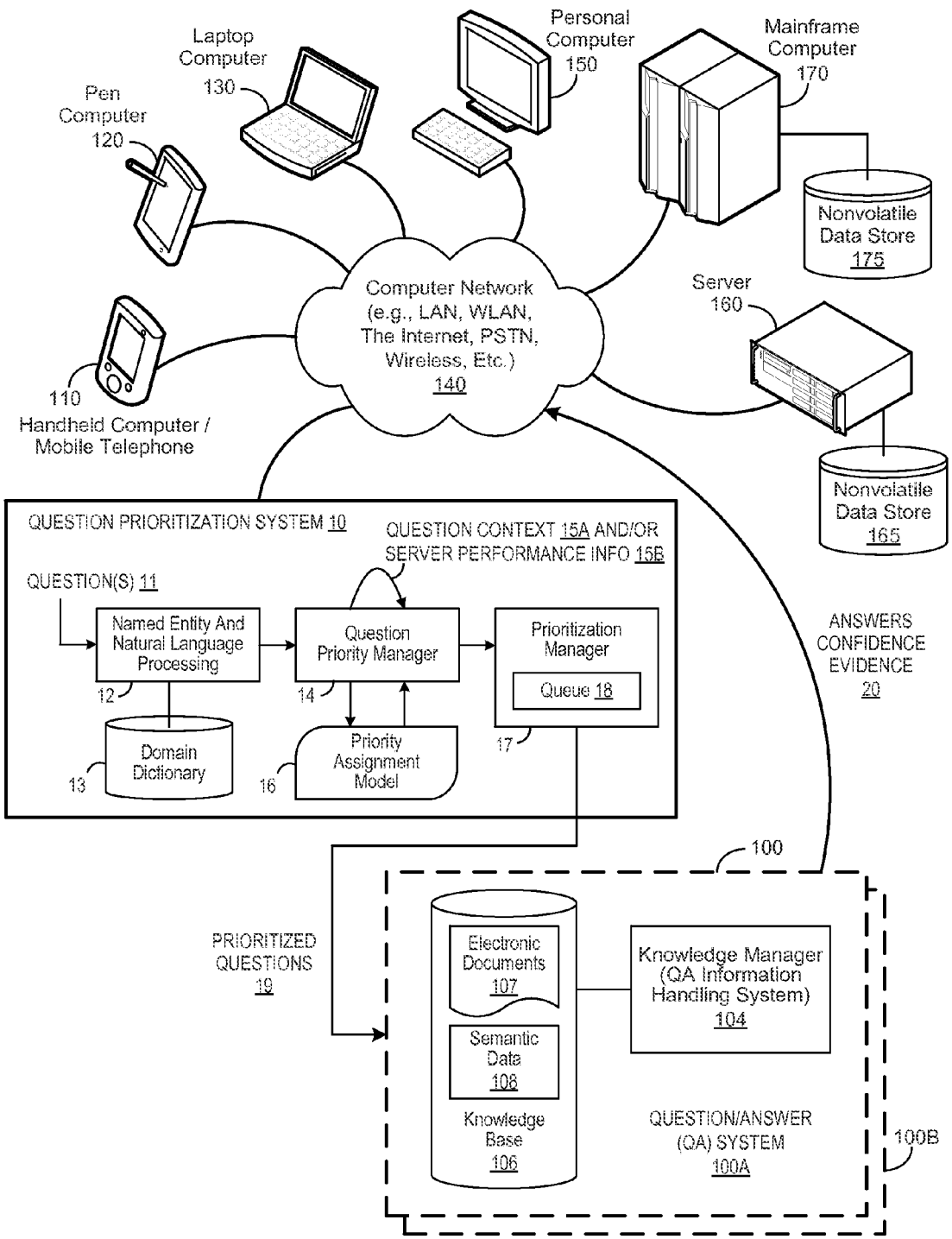
FIG. 1 depicts an exemplary client computer in which the present invention may be implemented.

A method, system and computer-usable medium are disclosed for performing a usage monitoring operation on an item. In various embodiments, the usage monitoring operation monitors the usage of an item and based upon certain predefined criteria generates an indication when the certain criteria are detected. In various embodiments, the predefined criteria defines an amount of time that a personal item has not been used and the indication comprises an indication that the personal item has not been used in a threshold amount of time. In various embodiments, the indication includes one or more of a visual indication, a short message type indication and a machine readable indication. In various embodiments, the usage monitoring operation interacts with a sensor associated with the item. In various embodiments, the sensor includes one or more of an RFID sensor, a Bluetooth compatible sensor, an environmental sensor (e.g., a temperature or moisture sensor) and an accelerometer sensor. When the item is used, the information on the sensor is updated to indicate usage. In various embodiments, the information from the sensor is provided to a user or a usage monitoring system. For example, the information may be provided to a user. This information may be provided to a user via a visual indication (e.g., by causing the sensor to change color, to glow or to present a message) or may be provided via a notification such as a short message or displayed alert. Additionally in various embodiments, the sensor can cause a device associated with the item to present a visual indication. For example, a hanger might be associated with a particular clothing item and upon detection of use or non-use of the item, characteristics of the hanger can be changed (e.g., the color of the hanger, causing the hanger to glow, etc.). For example, suppose a user wishes to be alerted when they haven't worn a piece of clothing in over 6 months. Using this usage monitoring operation, if the clothing item associated with the hanger hasn't been worn or moved from the hanger, the hanger will glow (e.g., will glow red). In various embodiments, a user can set a preference for when to be alerted when an item has not been used for a predetermined amount of time. After the set amount of time passes, an indication is generated to represent that the item has not been used for the predetermined amount of time.

While this invention has an obvious use case for our homes, it could also be used in a commercial application such as for tracking physical merchandise within a retail establishment. For example in a commercial application it would be advantageous to be able to alert salespersons to freshen up displays (e.g., clothing display) or when to replace one set of merchandise with another based on how often consumers try on items. Additionally, in various embodiments, this information is provided to the usage monitoring system to enable analytics to be performed based upon for example how often an item is tried on versus how often the item is purchased.

The present invention may be a system, a method, and/or a computer program product. In addition, selected aspects of the present invention may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present invention may take the form of computer program product embodied in a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a schematic diagram of one illustrative embodiment of a question prioritization system 10 and Question Answering (QA) system 100 connected to a computer network 140. The QA system 100 includes a knowledge manager 104 that is connected to a knowledge base 106 and configured to provide Question Answering (QA) generation functionality for one or more content users who submit questions across the network 140 to the QA system 100. To assist with efficient sorting and presentation of questions to the QA system 100, the prioritization system 10 may be connected to the computer network 140 to receive user questions, and may include a plurality of subsystems which interact with cognitive systems, like the knowledge manager 100, to prioritize questions or requests being submitted to the knowledge manager 100.

The Named Entity subsystem 12 receives and processes each question 11 by using Natural Language (NL) processing to analyze each question and extract question topic information contained in the question, such as named entities, phrases, urgent terms, and/or other specified terms which are stored in one or more domain entity dictionaries 13. By leveraging a plurality of pluggable domain dictionaries relating to different domains or areas (e.g., travel, healthcare, electronics, game shows, financial services), the domain dictionary 11 enables critical and urgent words (e.g., "account balance") from different domains (e.g., "banking") to be identified in each question based on their presence in the domain dictionary 13. To this end, the Named Entity subsystem 12 may use a Natural Language Processing (NLP) routine to identify the question topic information in each question. As used herein, "NLP" refers to the field of computer science, artificial intelligence, and linguistics concerned with the interactions between computers and human (natural) languages. In this context, NLP is related to the area of human-computer interaction and natural language understanding by computer systems that enable computer systems to derive meaning from human or natural language input. For example, NLP can be used to derive meaning from a human-oriented question such as, "How can I calculate my bank balance?" and to identify specified terms, such as named entities, phrases, or urgent terms contained in the question. The process identifies key terms and attributes in the question and compares the identified terms to the stored terms in the domain dictionary 13.

The Question Priority Manager subsystem 14 performs additional processing on each question to extract question context information 15A. In addition or in the alternative, the Question Priority Manager subsystem 14 may also extract server performance information 15B for the question prioritization system 10 and/or QA system 100. In selected embodiments, the extracted question context information 15A may include data that identifies the user context and location when the question was submitted or received. For example, the extracted question context information 15A may include data that identifies the user who submitted the question (e.g., through login credentials), the device or computer which sent the question, the channel over which the question was submitted, the location of the user or device that sent the question, any special interest location indicator (e.g., hospital, public-safety answering point, etc.), or other context-related data for the question. The Question Priority Manager subsystem 14 may also determine or extract selected server performance data 15B for the processing of each question. In selected embodiments, the server performance information 15B may include operational metric data relating to the available processing resources at the question prioritization system 10 and/or QA system 100, such as operational or run-time data, CPU utilization data, available disk space data, bandwidth utilization data, etc. As part of the extracted information 15A/B, the Question Priority Manager subsystem 14 may identify the SLA or QoS processing requirements that apply to the question being analyzed, the history of analysis and feedback for the question or submitting user, and the like. Using the question topic information and extracted question context and/or server performance information, the Question Priority Manager subsystem 14 is configured to populate feature values for the Priority Assignment Model 16 which provides a machine learning predictive model for generating a target priority values for the question, such as by using an artificial intelligence (AI) rule-based logic to determine and assign a question urgency value to each question for purposes of prioritizing the response processing of each question by the QA system 100.

The Prioritization Manager subsystem 17 performs additional sort or rank processing to organize the received questions based on at least the associated target priority values such that high priority questions are put to the front of a prioritized question queue 18 for output as prioritized questions 19. In the question queue 18 of the Prioritization Manager subsystem 17, the highest priority question is placed at the front for delivery to the assigned QA system 100. In selected embodiments, the prioritized questions 19 from the Prioritization Manager subsystem 17 that have a specified target priority value may be assigned to a specific pipeline (e.g., QA System 100A) in the QA system cluster 100. As will be appreciated, the Prioritization Manager subsystem 17 may use the question queue 18 as a message queue to provide an asynchronous communications protocol for delivering prioritized questions 19 to the QA system 100 such that the Prioritization Manager subsystem 17 and QA system 100 do not need to interact with a question queue 18 at the same time by storing prioritized questions in the question queue 18 until the QA system 100 retrieves them. In this way, a wider asynchronous network supports the passing of prioritized questions as messages between different computer systems 100A, 100B, connecting multiple applications and multiple operating systems. Messages can also be passed from queue to queue in order for a message to reach the ultimate desired recipient. An example of a commercial implementation of such messaging software is IBM's WebSphere MQ (previously MQ Series). In selected embodiments, the organizational function of the Prioritization Manager subsystem 17 may be configured to convert over-subscribing questions into asynchronous responses, even if they were asked in a synchronized fashion.

The QA system 100 may include one or more QA system pipelines 100A, 100B, each of which includes a computing device 104 (comprising one or more processors and one or more memories, and potentially any other computing device elements generally known in the art including buses, storage devices, communication interfaces, and the like) for processing questions received over the network 140 from one or more users at computing devices (e.g., 110, 120, 130) connected over the network 140 for communication with each other and with other devices or components via one or more wired and/or wireless data communication links, where each communication link may comprise one or more of wires, routers, switches, transmitters, receivers, or the like. In this networked arrangement, the QA system 100 and network 140 may enable Question Answering (QA) generation functionality for one or more content users. Other embodiments of QA system 100 may be used with components, systems, sub-systems, and/or devices other than those that are depicted herein.

In each QA system pipeline 100A, 100B, a prioritized question 19 is received and prioritized for processing to generate an answer 20. In sequence, prioritized questions 19 are de-queued from the shared question queue 18, from which they are de-queued by the pipeline instances for processing in priority order rather than insertion order. In selected embodiments, the question queue 18 may be implemented based on a "priority heap" data structure. During processing within a QA system pipeline (e.g., 100A), questions may be split into many subtasks which run concurrently. A single pipeline instance can process a number of questions concurrently, but only a certain number of subtasks. In addition, each QA system pipeline may include a prioritized queue (not shown) to manage the processing order of these subtasks, with the top-level priority corresponding to the time that the corresponding question started (earliest has highest priority). However, it will be appreciated that such internal prioritization within each QA system pipeline may be augmented by the external target priority values generated for each question by the Question Priority Manager subsystem 14 to take precedence or ranking priority over the question start time. In this way, more important or higher priority questions can "fast track" through the QA system pipeline if it is busy with already-running questions.

In the QA system 100, the knowledge manager 104 may be configured to receive inputs from various sources. For example, knowledge manager 104 may receive input from the question prioritization system 10, network 140, a knowledge base or corpus of electronic documents 106 or other data, a content creator 108, content users, and other possible sources of input. In selected embodiments, some or all of the inputs to knowledge manager 104 may be routed through the network 140 and/or the question prioritization system 10. The various computing devices (e.g., 110, 120, 130, 150, 160, 170) on the network 140 may include access points for content creators and content users. Some of the computing devices may include devices for a database storing the corpus of data as the body of information used by the knowledge manager 104 to generate answers to cases. The network 140 may include local network connections and remote connections in various embodiments, such that knowledge manager 104 may operate in environments of any size, including local and global, e.g., the Internet. Additionally, knowledge manager 104 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in a document 106 for use as part of a corpus of data with knowledge manager 104. The document 106 may include any file, text, article, or source of data (e.g., scholarly articles, encyclopedia references, textbooks, blogs, online courses of study and the like) for use in knowledge manager 104. Content users may access knowledge manager 104 via a network connection or an Internet connection to the network 140, and may input questions to knowledge manager 104 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager. Knowledge manager 104 may interpret the question and provide a response to the content user containing one or more answers to the question. In some embodiments, knowledge manager 104 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input prioritized question 19 and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. The QA system 100 then generates an output response or answer 20 with the final answer and associated confidence and supporting evidence. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information processing systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information processing systems include pen, or tablet, computer 120, laptop, or notebook, computer 130, personal computer system 150, and server 160. As shown, the various information processing systems can be networked together using computer network 140. Types of computer network 140 that can be used to interconnect the various information processing systems include Local Area Networks (LANs), Wireless Local Area Networks (WLANs), the Internet, the Public Switched Telephone Network (PSTN), other wireless networks, and any other network topology that can be used to interconnect the information processing systems. Many of the information processing systems include nonvolatile data stores, such as hard drives and/or nonvolatile memory. Some of the information processing systems may use separate nonvolatile data stores (e.g., server 160 utilizes nonvolatile data store 165, and mainframe computer 170 utilizes nonvolatile data store 175). The nonvolatile data store can be a component that is external to the various information processing systems or can be internal to one of the information processing systems. An illustrative example of an information processing system showing an exemplary processor and various components commonly accessed by the processor is shown in FIG. 2.

Figure 2:
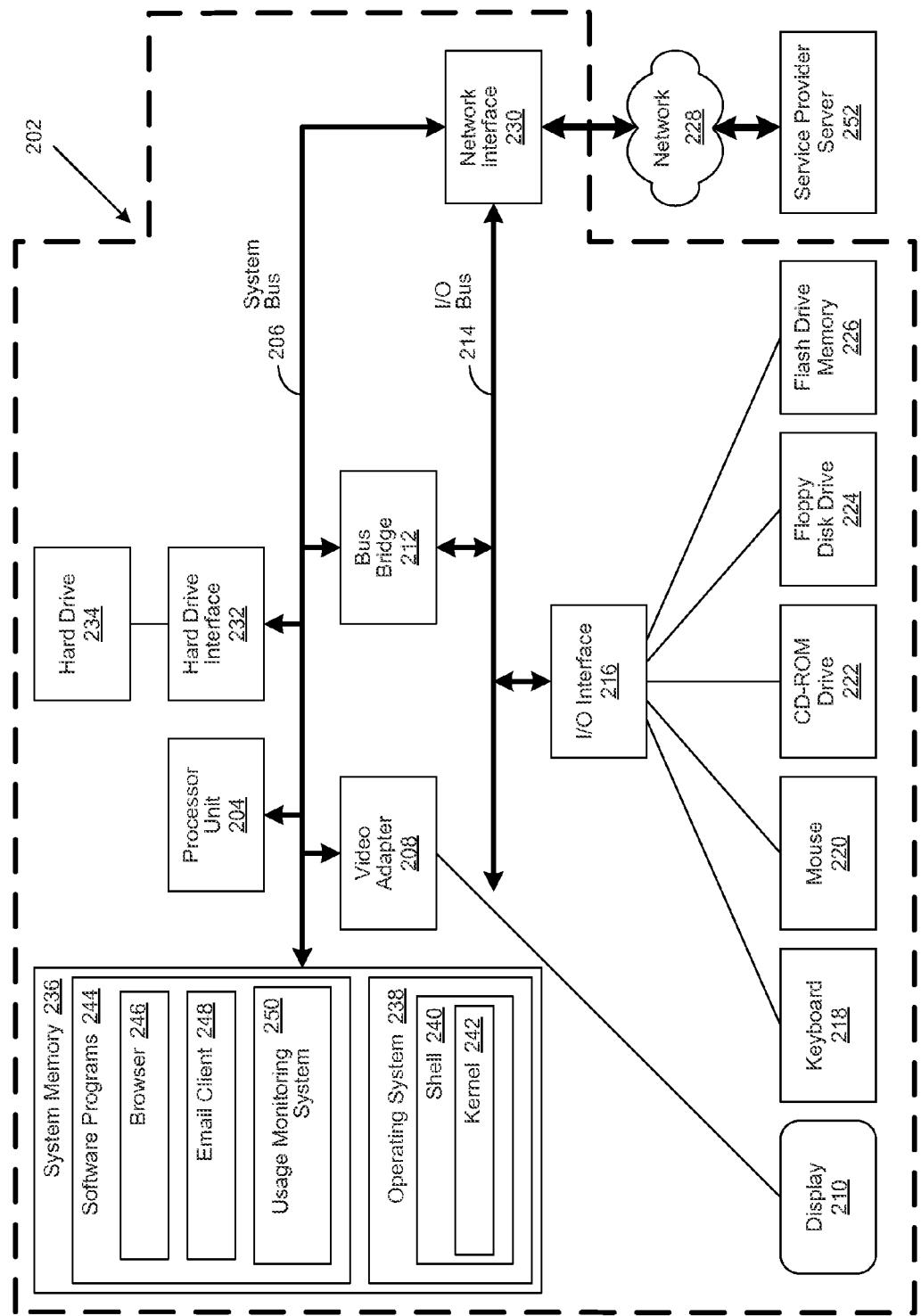
FIG. 2 is a simplified block diagram of an information handling system capable of performing computing operations.

FIG. 2 illustrates an information processing system 202, more particularly, a processor and common components, which is a simplified example of a computer system capable of performing the computing operations described herein. Information processing system 202 includes a processor unit 204 that is coupled to a system bus 206. A video adapter 208, which controls a display 210, is also coupled to system bus 206. System bus 206 is coupled via a bus bridge 212 to an Input/Output (I/O) bus 214. An I/O interface 216 is coupled to I/O bus 214. The I/O interface 216 affords communication with various I/O devices, including a keyboard 218, a mouse 220, a Compact Disk-Read Only Memory (CD-ROM) drive 222, a floppy disk drive 224, and a flash drive memory 226. The format of the ports connected to I/O interface 216 may be any known to those skilled in the art of computer architecture, including but not limited to Universal Serial Bus (USB) ports.

The information processing system 202 is able to communicate with a service provider server 252 via a network 228 using a network interface 230, which is coupled to system bus 206. Network 228 may be an external network such as the Internet, or an internal network such as an Ethernet Network or a Virtual Private Network (VPN). Using network 228, client computer 202 is able to use the present invention to access service provider server 252.

A hard drive interface 232 is also coupled to system bus 206. Hard drive interface 232 interfaces with a hard drive 234. In a preferred embodiment, hard drive 234 populates a system memory 236, which is also coupled to system bus 206. Data that populates system memory 236 includes the information processing system's 202 operating system (OS) 238 and software programs 244.

OS 238 includes a shell 240 for providing transparent user access to resources such as software programs 244. Generally, shell 240 is a program that provides an interpreter and an interface between the user and the operating system. More specifically, shell 240 executes commands that are entered into a command line user interface or from a file. Thus, shell 240 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. While shell 240 generally is a text-based, line-oriented user interface, the present invention can also support other user interface modes, such as graphical, voice, gestural, etc.

As depicted, OS 238 also includes kernel 242, which includes lower levels of functionality for OS 238, including essential services required by other parts of OS 238 and software programs 244, including memory management, process and task management, disk management, and mouse and keyboard management. Software programs 244 may include a browser 246 and email client 248. Browser 246 includes program modules and instructions enabling a World Wide Web (WWW) client (i.e., information processing system 202) to send and receive network messages to the Internet using HyperText Transfer Protocol (HTTP) messaging, thus enabling communication with service provider server 252. In various embodiments, software programs 244 may also include a usage monitoring system 250. In these and other embodiments, the usage monitoring system 250 includes code for implementing the processes described hereinbelow. In one embodiment, information processing system 202 is able to download the complex task analysis system 250 from a service provider server 252.

The usage monitoring system 250 performs a usage monitoring operation on an item. In various embodiments, the usage monitoring operation monitors the usage of an item and based upon certain predefined criteria generates an indication when the certain criteria are detected. In various embodiments, the predefined criteria defines an amount of time that a personal item has not been used and the indication comprises an indication that the personal item has not been used in a threshold amount of time. In various embodiments, the indication includes one or more of a visual indication, a short message type indication and a machine readable indication. In various embodiments, the usage monitoring operation interacts with a sensor associated with the item. In various embodiments, the sensor includes one or more of an RFID sensor, a Bluetooth compatible sensor, a Wifi sensor, an environmental sensor (e.g., a temperature or moisture sensor) and an accelerometer sensor. In various embodiments, the item can connect to another item via a short range communication operation (e.g., a Bluetooth type communication operation) with an indication that certain criteria have been detected. In various embodiments, the item can communicate via a WiFi type communication operation. In various embodiments, the indication includes a service event indication such as an application programming interface (API) service call.

When the item is used, the information on the sensor is updated to indicate usage. In various embodiments, the information from the sensor is provided to a user or a usage monitoring system. For example, the information may be provided to a user. This information may be provided to a user via a visual indication (e.g., by causing the sensor to change color, to glow or to present a message) or may be provided via a notification such as a short message or displayed alert. Additionally in various embodiments, the sensor can cause a device associated with the item to present a visual indication. For example, a hanger might be associated with a particular clothing item and upon detection of use or non-use of the item, characteristics of the hanger can be changed (e.g., the color of the hanger, causing the hanger to glow, etc.). For example, suppose a user wishes to be alerted when they haven't worn a piece of clothing in over 6 months. Using this usage monitoring operation, if the clothing item associated with the hanger hasn't been worn or moved from the hanger, the hanger will glow (e.g., will glow red). In various embodiments, a user can set a preference for when to be alerted when an item has not been used for a predetermined amount of time. After the set amount of time passes, an indication is generated to represent that the item has not been used for the predetermined amount of time.

While one use case for the usage monitoring operation is for items located within a user's home, it could also be used in a commercial application such as for tracking physical merchandise within a retail establishment. For example in a commercial application it would be advantageous to be able to alert salespersons to freshen up displays (e.g., clothing display) or when to replace one set of merchandise with another based on how often consumers try on items. Additionally, in various embodiments, this information is provided to the usage monitoring system to enable analytics to be performed based upon for example how often an item is tried on versus how often the item is purchased.

The hardware elements depicted in the information processing system 202 are not intended to be exhaustive, but rather are representative to highlight components used by the present invention. For instance, the information processing system 202 may include alternate memory storage devices such as magnetic cassettes, Digital Versatile Disks (DVDs), Bernoulli cartridges, and the like. These and other variations are intended to be within the spirit, scope and intent of the present invention.

Figure 3:
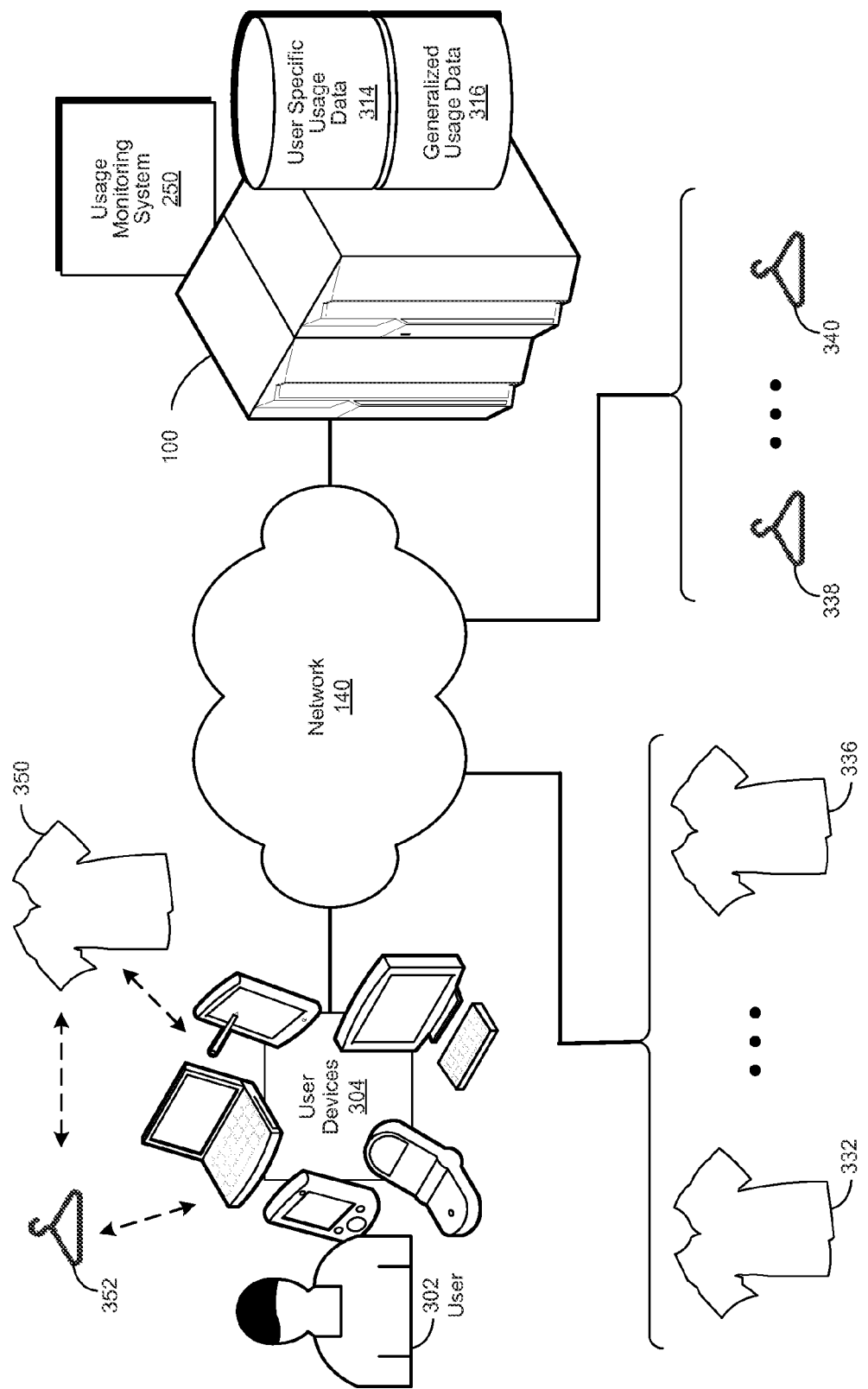
FIG. 3 is a usage monitoring environment implemented in accordance with an embodiment of the invention.

FIG. 3 is a simplified block diagram of a usage monitoring environment 300 implemented in accordance with an embodiment of the invention. In various embodiments, the usage monitoring environment 300 performs a usage monitoring operation on one or a plurality of items in response to a query from a user via e.g., a QA system such as QA system 100.

As used herein, a user device 304 refers to an information handling system such as a personal computer, a laptop computer, a tablet computer, a personal digital assistant (PDA), a smart phone, a mobile telephone, or other device that is capable of communicating and processing data. In various embodiments, the user device 304 is used to exchange information between the user 302 and a usage monitoring system 250 through the use of a network 140. In certain embodiments, the network 140 may be a public network, such as the Internet, a physical private network, a wireless network, a virtual private network (VPN), or any combination thereof. Skilled practitioners of the art will recognize that many such embodiments are possible and the foregoing is not intended to limit the spirit, scope or intent of the invention.

In this embodiment, a usage monitoring system 250 is implemented on an information handling system 100 to respectively monitor sensors associated with a plurality of items 332, 336 as well as items 338, 340. Additionally in various embodiments, an item 332 may communicate directly with an item 338. Additionally, in various embodiments, an item 350 may communicate directly with a user device 304, which may itself include a usage monitoring system 250. Additionally, in various embodiments, an item 352 may communicate directly with the user device 304 as well as optionally with the item 350.

In various embodiments, the user specific usage data, retrieved from respective user items may be stored in the repositories of user specific data 314. In various embodiments, generalized usage data, retrieved from a plurality of items (which may be associated or unassociated with other items within the plurality of items) may be stored in the repositories of generalized usage data 316.

Although the present invention has been described in detail, it should be understood that various changes, substitutions and alterations can be made hereto without departing from the spirit and scope of the invention as defined by the appended claims.

What is claimed is:

1. A computer-implemented method for performing a usage monitoring operation on an item, comprising:
defining a predefined criteria relating to usage of the item, the item comprising a clothing item;
monitoring usage of the item based upon input provided by a sensor associated with the item, the sensor being included with a hanger, the hanger being associated with the clothing item; and,
generating an indication when the predefined criteria is detected, the sensor causes the hanger associated with the clothing item to present a visual indication, the visual indication causing a characteristic of the hanger to change.

2. The method of claim 1, wherein:
the predefined criteria defines an amount of time that the item has not been used and the indication comprises an indication that the personal item has not been used in a threshold amount of time.

3. The method of claim 1, wherein:
the indication includes one or more of a visual indication, a short message type indication, a service event indication, and a machine readable indication.

4. The method of claim 1, wherein:
the sensor comprises at least one of an RFID sensor, a Bluetooth compatible sensor, a WiFi sensor, an environmental sensor and an accelerometer sensor.

5. The method of claim 1, wherein:
a user can set a preference for when to be alerted when an item has not been used for a predetermined amount of time and after the set amount of time passes, the indication is generated to represent that the item has not been used for the predetermined amount of time.

6. A system comprising:
a processor;
a data bus coupled to the processor; and
a computer-usable medium embodying computer program code, the computer-usable medium being coupled to the data bus, the computer program code used for analyzing and deducing criteria-related content for evaluation in a system capable of answering questions and comprising instructions executable by the processor and configured for:
defining a predefined criteria relating to usage of the item, the item comprising a clothing item;
monitoring usage of the item based upon input provided by a sensor associated with the item, the sensor being included with a hanger, the hanger being associated with the clothing item; and,
generating an indication when the predefined criteria is detected, the sensor causes the hanger associated with the clothing item to present a visual indication, the visual indication causing a characteristic of the hanger to change.

7. The system of claim 6, wherein the instructions executable by the processor are further configured for:
the predefined criteria defines an amount of time that the item has not been used and the indication comprises an indication that the personal item has not been used in a threshold amount of time.

8. The system of claim 7, wherein:
the indication includes one or more of a visual indication, a short message type indication, a service event indication, and a machine readable indication.

9. The system of claim 6, wherein:
the sensor comprises at least one of an RFID sensor, a Bluetooth compatible sensor, a WiFi sensor, an environmental sensor and an accelerometer sensor.

10. The system of claim 6, wherein:
a user can set a preference for when to be alerted when an item has not been used for a predetermined amount of time and after the set amount of time passes, the indication is generated to represent that the item has not been used for the predetermined amount of time.

11. A non-transitory, computer-readable storage medium embodying computer program code, the computer program code comprising computer executable instructions configured for:
- defining a predefined criteria relating to usage of the item, the item comprising a clothing item;
- monitoring usage of the item based upon input provided by a sensor associated with the item, the sensor being included with a hanger, the hanger being associated with the clothing item; and,
- generating an indication when the predefined criteria is detected, the sensor causes the hanger associated with the clothing item to present a visual indication, the visual indication causing a characteristic of the hanger to change.

12. The non-transitory, computer-readable storage medium of claim 11, wherein the computer executable instructions are further configured for:
- the predefined criteria defines an amount of time that the item has not been used and the indication comprises an indication that the personal item has not been used in a threshold amount of time.

13. The non-transitory, computer-readable storage medium of claim 11, wherein:
- the indication includes one or more of a visual indication, a short message type indication, a service event indication, and a machine readable indication.

14. The non-transitory, computer-readable storage medium of claim 11, wherein:
- the sensor comprises at least one of an RFID sensor, a Bluetooth compatible sensor, a WiFi sensor, an environmental sensor and an accelerometer sensor.

15. The non-transitory, computer-readable storage medium of claim 11, wherein:
- a user can set a preference for when to be alerted when an item has not been used for a predetermined amount of time and after the set amount of time passes, the indication is generated to represent that the item has not been used for the predetermined amount of time.

16. The non-transitory, computer-readable storage medium of claim 11, wherein the computer executable instructions are deployable to a client system from a server system at a remote location.

17. The non-transitory, computer-readable storage medium of claim 11, wherein the computer executable instructions are provided by a service provider to a user on an on-demand basis.

* * * * *